(12) United States Patent
Hirao et al.

(10) Patent No.: US 8,390,876 B2
(45) Date of Patent: Mar. 5, 2013

(54) APPARATUS, METHOD, AND COMPUTER PROGRAM PRODUCT FOR READING IMAGE DISPLAYED ON ELECTRICAL PAPER BASED ON SELECTED SIZE OF PAPER OR IMAGE

(75) Inventors: Toyomi Hirao, Kawasaki (JP); Koji Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 12/828,057

(22) Filed: Jun. 30, 2010

(65) Prior Publication Data
US 2010/0328729 A1 Dec. 30, 2010

Related U.S. Application Data

(63) Continuation of application No. PCT/JP2009/061473, filed on Jun. 24, 2009.

(51) Int. Cl.
H04N 1/04 (2006.01)
H04N 1/047 (2006.01)
H04N 1/10 (2006.01)
H04N 1/12 (2006.01)
H04N 1/387 (2006.01)
H04N 1/393 (2006.01)

(52) U.S. Cl. .......... 358/1.2; 358/1.6; 358/449; 358/451; 358/453; 358/474; 358/488; 358/496; 358/497

(58) Field of Classification Search .................... 358/1.2, 358/1.6, 505, 528, 538, 449, 451, 453, 474, 358/488, 494, 496–498
See application file for complete search history.

(56) References Cited

U.S. PATENT DOCUMENTS

| 7,492,945 | B2 * | 2/2009 | Yamazaki et al. | 382/187 |
|---|---|---|---|---|
| 7,495,811 | B2 * | 2/2009 | Soda | 358/474 |
| 7,869,654 | B2 * | 1/2011 | Yamazaki et al. | 382/187 |
| 8,054,483 | B2 * | 11/2011 | Katsuyama | 358/474 |
| 8,089,647 | B2 * | 1/2012 | Hotta et al. | 358/474 |
| 2008/0080010 | A1 * | 4/2008 | Korst | 358/400 |
| 2008/0112021 | A1 | 5/2008 | Katsuyama | |
| 2008/0130071 | A1 | 6/2008 | Katsuyama | |
| 2009/0009829 | A1 | 1/2009 | Katsuyama | |
| 2009/0315901 | A1 * | 12/2009 | Qiao et al. | 345/522 |
| 2011/0050544 | A1 * | 3/2011 | Tomono | 345/1.3 |
| 2012/0113480 | A1 * | 5/2012 | Mochizuki et al. | 358/449 |

FOREIGN PATENT DOCUMENTS

| JP | 2004-056369 A | 2/2004 |
|---|---|---|
| JP | 2007-144674 A | 6/2007 |
| JP | 2008-124722 A | 5/2008 |
| JP | 2008-141590 A | 6/2008 |
| JP | 2009-004980 A | 1/2009 |

* cited by examiner

*Primary Examiner* — Scott A Rogers
(74) *Attorney, Agent, or Firm* — Canon U.S.A., Inc. IP Division

(57) ABSTRACT

The image reading apparatus, which is capable of communicating with the electrical paper displaying an image based on image data, is configured to select whether the image displayed on the electrical paper is read based on a size of the electrical paper or a size of the image data, when the image is read, and to instruct the electrical paper to change a display content of the image to be displayed on the electrical paper, in accordance with a result of the selection.

10 Claims, 14 Drawing Sheets

APPARATUS, METHOD, AND COMPUTER PROGRAM PRODUCT FOR READING IMAGE DISPLAYED ON ELECTRICAL PAPER BASED ON SELECTED SIZE OF PAPER OR IMAGE

This application is a Continuation of International Application No. PCT/JP2009/061473, filed Jun. 24, 2009, which is hereby incorporated by reference herein in its entirety.

BACKGROUND OF THE INVENTION

1. Field of the Invention

The present invention relates to an image reading apparatus, a control method and a computer readable program storage of the apparatus.

2. Description of the Related Art

In late years, a document-sheet conveying device is mounted in an image reading apparatus for reading an image of a document sheet. Therefore, a moving-document-reading method is generally used in which a plurality of document sheets are set at the document-sheet conveying device and the plurality of document sheets are read using a fixed optical system unit by separating and transporting the plurality of document sheets. Also, in the case where a plurality of document sheets are read by using an image reading apparatus without the document-sheet conveying device, a stationary-document-reading method is used in which a plurality of document sheets is set one by one on a document positioning glass plate of the image reading apparatus and the plurality of document sheets are repeatedly read using a optical system.

Such an image reading apparatus usually has a document-sheet-size detection mechanism. For example, when reading is performed using the document-sheet conveying device, a size of the document sheet is determined using a sensor of the document-sheet conveying device, and reading can be performed depending on the size. And then, a copy process can be performed such that a printing apparatus prints data on a sheet of the detected document size.

Also, in late years, development of "electrical paper" having both benefits of a paper and a display has been developed, and it is devised that an electrical paper is used in substitution for paper. Waste of paper can be restrained by using the electrical paper in substitution for paper. In such a background, a method to read both of a paper document-sheet and an electrical paper by using a document-sheet conveying device is devised as a method to read an image shown on the electrical paper by an image reading apparatus as disclosed in Japanese Paten Laid-Open No. 2008-141590.

A size of image data displayed on an electrical paper may not fit into a size of the electrical paper. For example, image data of the A3 size may be reduced to the A4 size and displayed on an electrical paper of the A4 size. Image data of the B5 size may be displayed on the electrical paper of the A4 size.

In the above cases, if an image reading apparatus performs reading of a document-sheet using the document-sheet-size detection mechanism that is conventional art, the detected size of a document sheet will not fit a real size of image data. That is, for example, a printed matter including a useless blank space will be provided if a copy process is performed in such situation because an image of the B5 size is printed on a paper of the A4 size detected by the document-sheet-size detection mechanism.

Thus, if reading of an electrical paper is performed using the document-sheet-size detection mechanism of conventional art, the reading that does not desired by a user might be performed due to mismatch between a size of the document sheet (a size of the electrical paper itself) and a size of displayed image data. Alternatively, a copy process that is not desired by a user might be performed.

The present invention is intended to solve such an issue. That is, the present invention is directed to preventing the reading undesired by the user when the image reading apparatus reads the electrical paper.

SUMMARY OF THE INVENTION

One of the aspects of the present invention is directed to an apparatus comprising: a selecting unit configured to, when the image displayed on the electrical paper is read, select whether the image displayed on the electrical paper is read based on a size of the electrical paper or based on a size of the image data; and an instruction unit configured to instruct the electrical paper to change a display content of an image to be displayed on the electrical paper in accordance with a result of the selection by the selecting unit.

Further features of the present invention will become more apparent from the following description of exemplary embodiments with reference to the attached drawings.

DESCRIPTION OF THE EMBODIMENTS

Embodiments according to the present invention will be described below in detail exemplarily with reference to the drawings. However, a structure described in the following embodiments is no more than an example. Therefore, the present invention should not be limited to the following embodiments.

Figure 1:
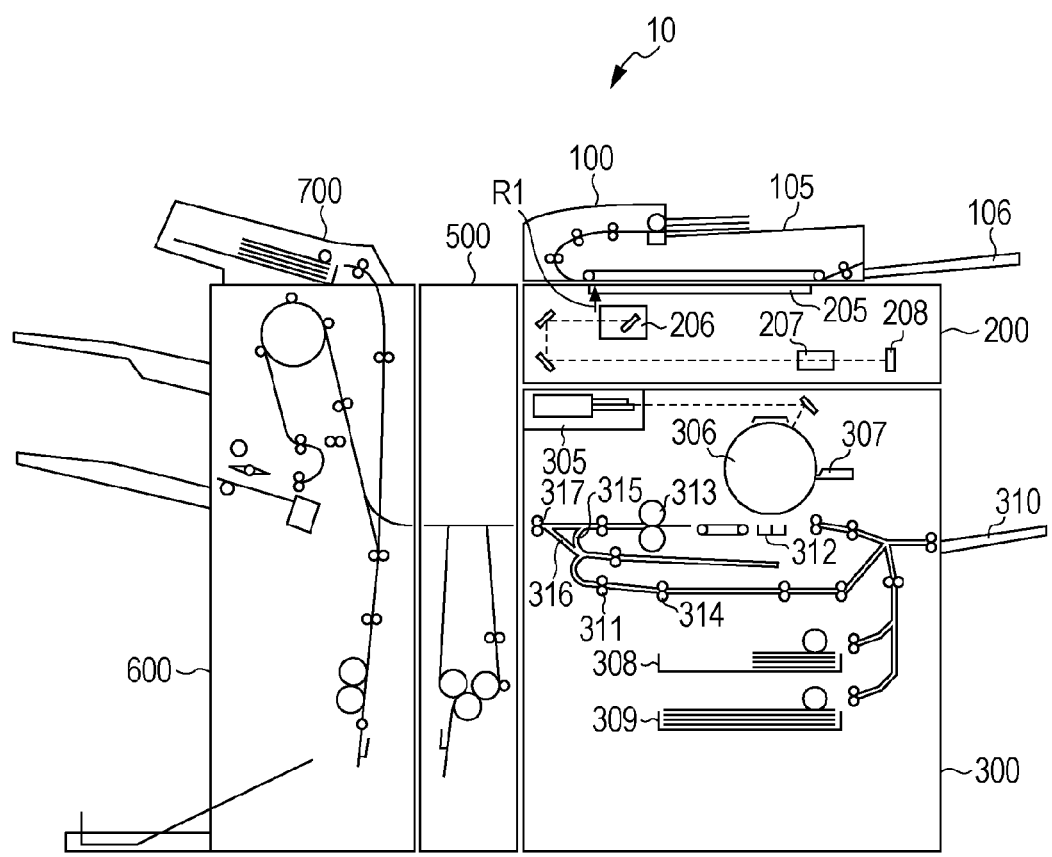
FIG. 1 is a figure showing a structure of an image forming apparatus in an embodiment of the present invention.

FIG. 1 is a figure showing a structure of an image forming apparatus 10 applied to an image reading apparatus in the embodiment of the present invention. The image forming apparatus 10 includes a main body of an image forming apparatus comprising an image reader 200 and a printer unit 300, a folding device 500, and a finisher 600. A document-sheet conveying device 100 is placed on the upper part of an image reader 200.

The document-sheet conveying device 100 is placed on the upper part of the image forming apparatus 10 such that the document-sheet conveying device 100 can be opened and closed. The document-sheet conveying device performs a paper feed of a plurality of document sheets set on a document-sheet tray 105 sequentially from the first page of the plurality of document sheets sheet by sheet. And then, the document sheet is transported onto a document-sheet positioning glass plate 205 through a path which is curved. As one of the methods to read one side document-sheet, there is a moving-document-reading method in which a document sheet is transported to a reading position R1 at predetermined reading speed, a reading process of the document sheet is performed with a scanner unit 206 fixed at the reading position R1, and the read document sheet is output onto a paper output tray 106. As another method, there is a stationary-document-reading method in which a document sheet is set on the document-sheet positioning glass plate 205 and is read by scanning the document sheet using the scanner unit 206. The detailed description will be described below.

The image reader 200 optically reads image information of a document sheet, and inputs, by performing photoelectric conversion, the image information as image data. The image reader 200 has the document-sheet positioning glass plate 205, the scanner unit 206 having a lamp and a mirror which are not illustrated, a lens 207, and an image sensor 208 and so on. When the document-sheet conveying device 100 is not used, the image reader 200 reads the image information of the document sheet, by opening the document-sheet conveying device, setting the document sheet on the document-sheet positioning glass plate 205, and scanning the image information of the document sheet by using the scanner unit 206.

An image of a document sheet, which is read by the image sensor 208 through the lens 207, is stored in a hard disk (not shown) and is sent to an exposure-control unit 305 through a printer control unit 301. The exposure-control unit 305 outputs a laser beam in accordance with an image signal. When the laser beam is irradiated to a photoconductive drum 306, an electrostatic latent image is generated on the photoconductive drum 306. The electrostatic latent image on the photoconductive drum 306 is developed by a development device 307, and a developer on the photoconductive drum 306 is transferred by a transfer unit 312 onto a sheet fed from any one of cassettes 308 or 309, a manual feeder unit 310, and a both-sides transportation path 311.

When the sheet that the developer has been transferred is led to a fixation unit 313, a fixation process of developer is performed. After the sheet which passed through the fixation unit 313 is led from a path 315 to a path 314 by a flapper which is not illustrated and the back end edge of the sheet passed through the path 315, the sheet is led from a path 316 to a discharge roller 317 by performing switchback of the sheet. Therefore, the sheet can be discharged from the printer unit 300 by the discharge roller 317 such that a surface where the developer has been transferred faces down. This technique is called an inversion paper ejection. Thus, by virtue of the feature that sheets are output in the face-down state, for example, in a case where images obtained by reading a plurality of document sheets using the document-sheet conveying device 100 is printed, image forming processing can be performed from the first page of the plurality of document sheets in the right page number order.

In addition, if image forming processing is performed on a hard sheet such as a OHP sheet by using the manual feeder unit 310, the sheet is output from the discharge roller 317, without leading to the path 315, such that a surface where the developer has been transferred faces up.

Also, when image forming processing is performed on the both sides of a sheet, the sheet is led from the fixation unit 313 to the path 315, a switchback is performed shortly after the back end edge of the sheet passed through the path 315, and the sheet is led to the both-sides transportation path 311 by the flapper which is not illustrated in order to lead to the path 314. An electrostatic latent image is transferred to the sheet led to the both-sides transportation path 311 again by the transfer unit 312, and a fixation process is performed by the fixation unit 313.

Thus, a path length, roller placement, and division of a drive system are adjusted so that sheets can be transported even if five pieces of half size paper such as A4 and B5 are in a path circuit where a sheet passes thought the transfer unit 312 and the both-sides transportation path 311 and then returns to the transfer unit 312. Also, in the above processing, since the sheets are output such that the odd number page is in the face-down state, the sheets in the both sides copy can be output in the correct page order.

The sheet discharged from the discharge roller 317 is sent into the folding device 500.

The folding device 500 performs a process to fold a sheet into a Z-fold configuration. When the folding process is specified for a sheet of the A3 size or the B4 size, the sheet is sent into a finisher 600 after the folding device 500 performs the folding process. However, in a case where the sheet of the size is other than the A3 size or B4 size, the sheet is directly sent into the finisher 600. The finisher 600 performs a bookbinding process, a stapling process, a punching process and so on.

Also, an inserter 700 is placed on the upper part of the finisher 600. The inserter 700 conveys a cover, a slip sheet or the like to the finisher 600.

Figure 2:
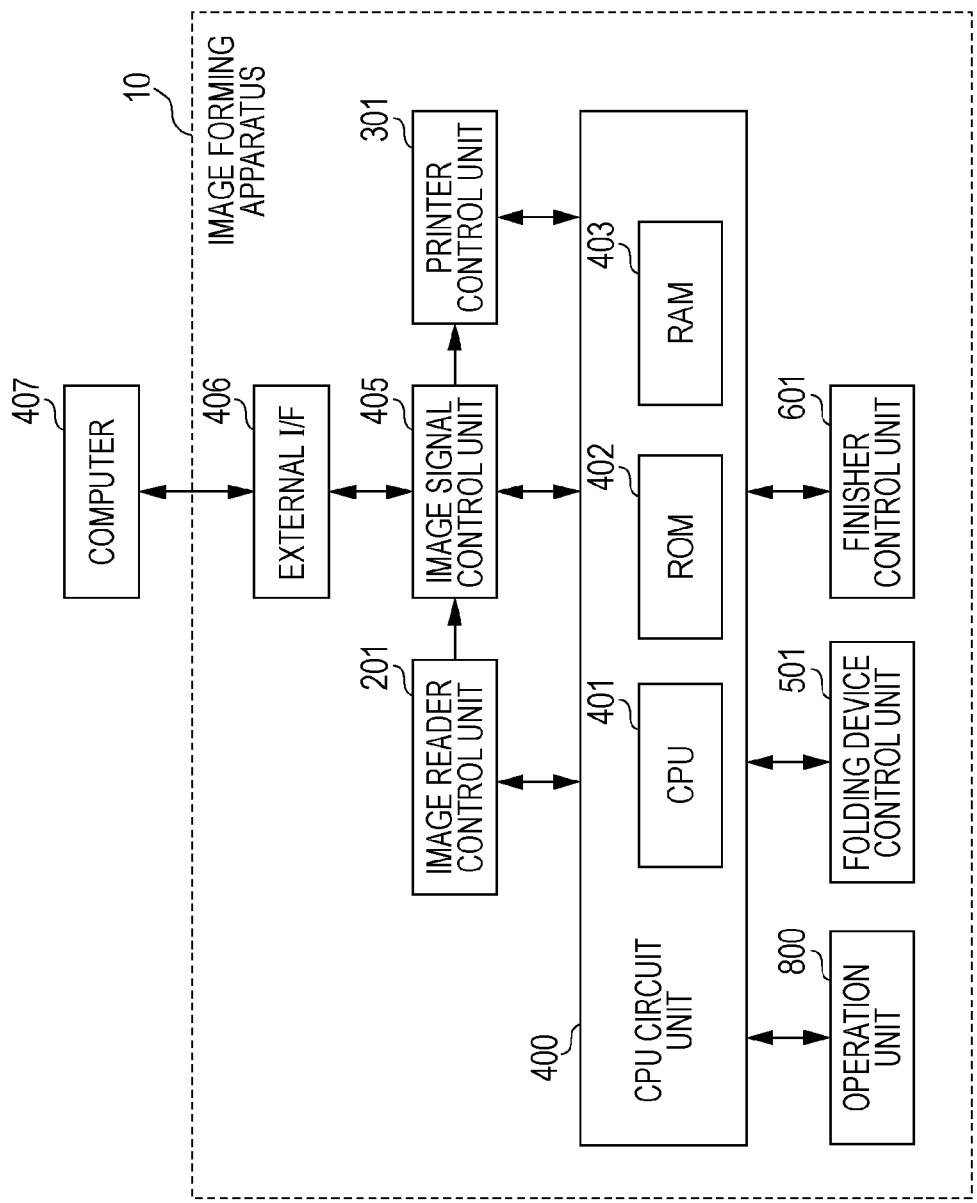
FIG. 2 is a figure showing a structure of a control unit of the image forming apparatus.

FIG. 2 is a block diagram showing a structure of a control unit of the image forming apparatus 10. The control unit controlling the whole image forming apparatus mainly consists of a CPU circuit unit 400.

The CPU circuit unit 400 is provided with a CPU 401, a ROM 402, a RAM 403 and so on. In the CPU circuit unit 400, the CPU 401 executes the program stored in the ROM 402 and the RAM 403 is used as an area where control data is temporarily held and a work area of the operation for the control. And, the CPU circuit unit 400 controls each control unit (an image reader control unit 201, an image signal control unit 405, a printer control unit 301, a folding device control unit 501, a finisher control unit 601, an external interface 406 or the like) based on setting input by a user via an operation unit 800. The image reader control unit 201 controls the document-sheet conveying device 100 and the image reader 200. The printer control unit 301 controls the printer unit 300. The folding device control unit 501 controls the folding device 500. The finisher control unit 601 controls the finisher 600.

The operation unit 800 comprises LCD display unit. A touch panel sheet is put on LCD, an operation screen of a system is displayed, and location information is transmitted to a CPU circuit unit 400 when a displayed key is pushed. The LCD display unit displays various types of screens to be described below, and the user can input instructions into the LCD display unit, in each screen. Also, the operation unit 800 comprises a hard key such as a ten key, a start key, a stop key, a reset key or the like, and the user can operate the hard key conveniently.

The external interface 406 is an interface with an external computer 407. The external interface 406 outputs print data sent from the external computer 407 to the image signal control unit 405. The image forming apparatus 10 can communicate with the external computer 407 via the external interface 406. The type of the interface includes a network such as LAN or the WAN, a USB, the Centronics interface or the like.

The image reader control unit 201 outputs an image read by the image sensor 208 and an image read by an image sensor in the scanner unit 206, to the image signal control unit 405. Furthermore, image data output from the image signal control unit 405 to the printer control unit 301 is input into an exposure-control unit 305.

Next, a method to perform image reading processing using the image reader 200 and the document-sheet conveying device 100 is described below in detail.

Figure 3:
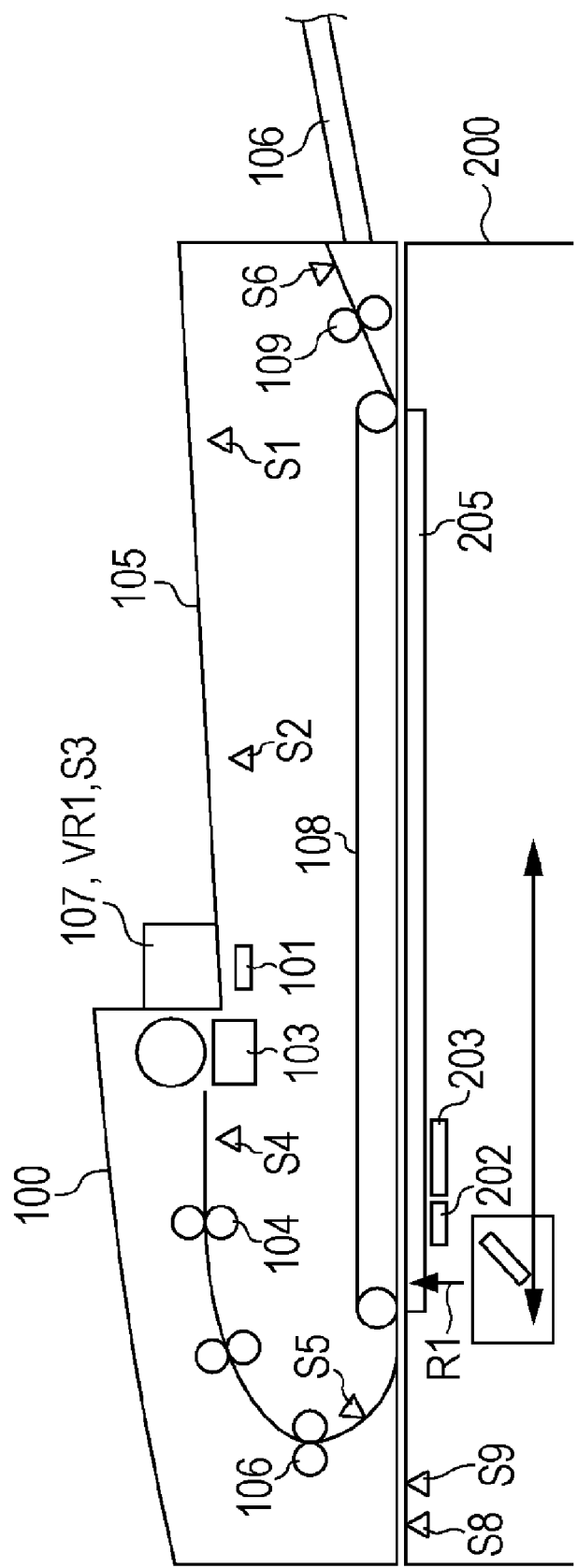
FIG. 3 is a sectional view of a document-sheet conveying device and an image reader.

The document-sheet reading process by document-sheet conveying device (ADF: Auto Document Feeder) 100 is described together with the brief description of a structure of the image reader 200 using FIG. 3 in detail.

The ADF 100 performs a paper feed of a plurality of document sheets set on the document-sheet tray 105 sequentially from the first page of the plurality of document sheets sheet by sheet. And then, the document sheet is transported onto a document positioning glass plate through a path which is curved. The image reader 200 optically reads image information of a document sheet, and inputs, by performing photoelectric conversion, the image information as image data.

The ADF 100 is arranged such that the ADF 100 can be opened and closed toward the image reader 200.

The image reader 200 comprises the document-sheet positioning glass plate 205, the scanner unit 206 having a lamp and a mirror which are not illustrated and so on. When image reading of the document sheet is performed without using the ADF 100, the image reader 200 reads the image information of the document sheet, by opening the ADF 100, setting the document sheet on the document-sheet positioning glass plate 205, and scanning the image information of the document sheet by using the scanner unit 206.

In the ADF 100, various sensors such as S1-S6 and VR1 are placed. S1 and S2 are a large size detect sensor and a small size detect sensor which detect longitudinal length (length of a conveying direction) of a document sheet put on a document-sheet tray 102. The S1 and S2 are located within the document-sheet tray 105. In a document-sheet width guide 107, a width detect volume VR1 which is not illustrated and a width detect sensor S3 are located.

A size sensor S4, which measures document-sheet length at the same time that the document sheet which was separated and being fed is detected by detecting the top edge and the back end edge of the document sheet, is located on a conveying circuit between a separating unit 103 separating a plurality of document sheets one by one and a conveying roller 104. A lead sensor S5 detecting the top edge of the document sheet is placed near a registration roller 106. A discharge sensor S6 is placed near a discharge roller 109. Also, a document-sheet set sensor S7 to determine whether a document-sheet is set on the document-sheet tray 105 is placed, but is not illustrated in FIG. 3.

Opening and closing detect sensors S8 and S9 detecting an opening and closing angle of the ADF 100 are placed in the image reader 200. A size of a document-sheet put on the document-sheet positioning glass plate 205 is identified by the opening and closing detect sensors S8 and S9, a size sensor which is not illustrated, and an exposure operation. The ADF 100 comprises an electrical paper detecting unit 101 to detect an electrical paper put on the document-sheet tray 105. The electrical paper detecting unit 101 is placed near the separating unit 103 and at the lower part of the document-sheet tray 102.

The image reader 200 comprises an electrical paper detecting unit 202 to detect the electrical paper put on the document-sheet positioning glass plate 205. The electrical paper detecting unit 202 is placed at the edge of the document-sheet positioning glass plate 205. Also, the image reader 200 includes a page switching unit 203 which is placed at the edge of the document-sheet positioning glass plate 205. The page switching unit 203 has a function to display, by communicating with the electrical paper, an image of an image file stored in the electrical paper on an obverse side surface (or a reverse side surface) such that the image is switched page by page.

The electrical paper, which is not illustrated, is, for example, a liquid crystal display (PFLCD) using a polymer film, and can be transformed into any shape. Also, RFID which is a wireless communication tag is included in the electrical paper. The ADF 100 can transport the electrical paper as transporting a paper.

In the image forming apparatus 10 in the embodiment of the present invention there are a moving document reading method (a moving original reading mode) and a stationary document reading method (a stationary document reading mode) as a method to read a one-side document sheet that image information was recorded on either a obverse side surface or a reverse side surface. In the moving-document-reading method, a document sheet is transported to a reading position R1 at a predetermined reading speed, reading of the document sheet is performed with a scanner unit 206 fixed at the reading position R1, and the read document sheet is output to the paper output tray 106. In the stationary-document-reading method, a document sheet is set on the document-sheet positioning glass plate 205, and is read by scanning the document sheet using the scanner unit 206.

Specifically, if a document-sheet bundle is stacked on the document-sheet tray 102 and then a start key is pushed down in an operation unit which is not illustrated, a top document sheet of the document-sheet bundle is brought into the separating unit 103 by rotating a supply roller which is not illustrated. The document sheets brought into the separating unit 103 are transported to a transportation roller 104 by separating one by one. The rotation of the registration roller 106 has stopped when the top edge of the document sheet arrived. After a loop is formed by transportation with the transportation roller 104 and skew-feeding correction of the document sheet was performed, the rotation of the registration roller 106 is started and the document sheet is transported to the reading unit.

In the reading unit, the document sheet is transported to the reading position R1 at predetermined speed by the registration roller 106 and a reading belt 108. When the top edge of the document sheet arrives at the reading position R1, exposure operation is performed with the scanner unit 206 fixed under the reading position R1, and reading is performed while transporting the document sheet. This reading method is a moving-original-reading mode.

On the other hand, when the back end edge of the document sheet arrived at the reading position R1, the document sheet is stopped and image reading is performed by scanning the image with the scanner unit 206 by moving the scanner unit 206 from one edge to another edge of the document sheet. This reading method is a stationary-document-reading mode.

When reading of the document sheet is finished, the document sheet is transported to the discharge roller 109 with the reading belt 108 and is output to the paper output tray 106 with the discharge roller 109.

Figure 4:
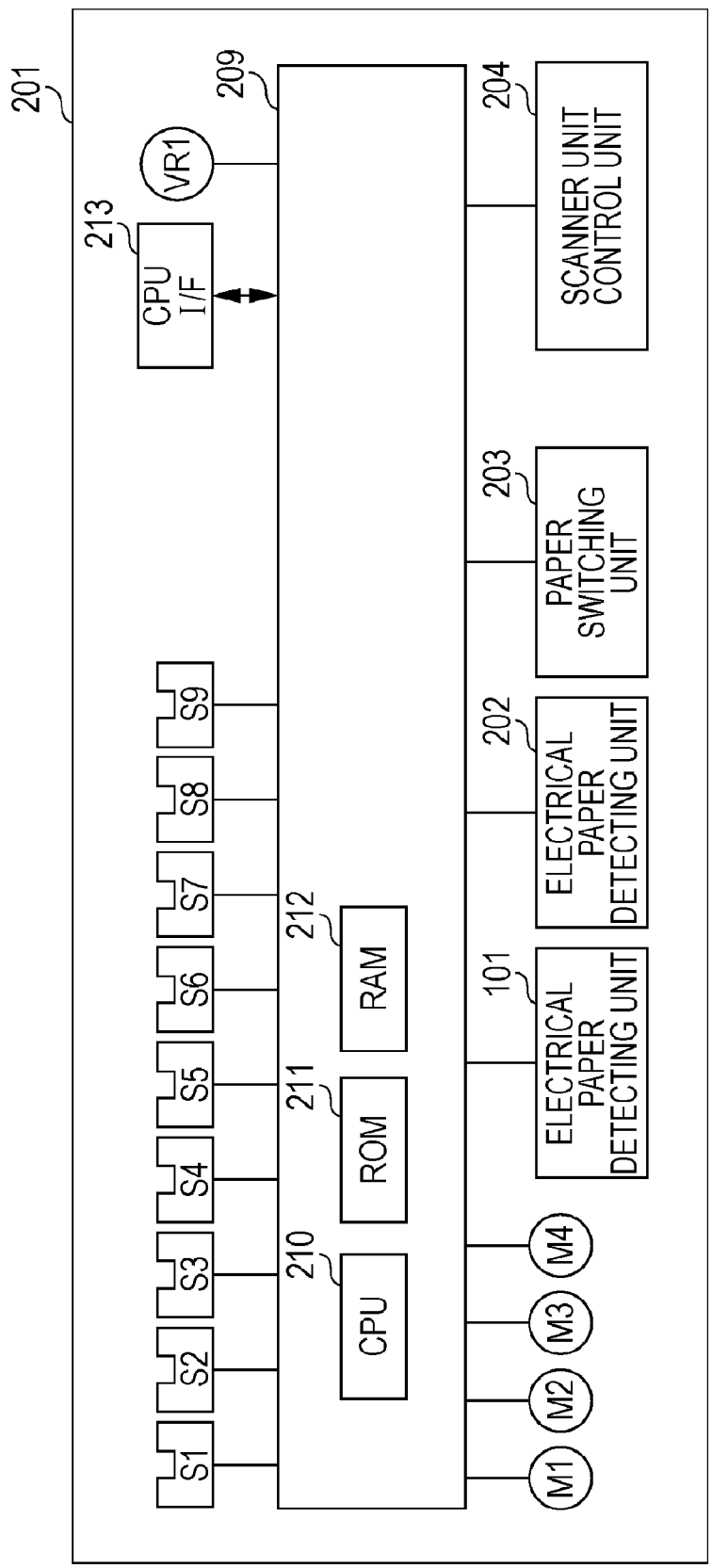
FIG. 4 is a figure showing a structure of an image reader control unit.

FIG. 4 is a block diagram which shows skeleton framework of the image reader control unit 201 in FIG. 2.

A CPU circuit unit 209 comprises a CPU 210, a ROM 211 storing a program executed by the CPU 210, and a RAM 212 used for temporarily storing control data, used as a work area where calculation accompanying control is performed, and so on. The CPU 210 controls the whole image reader 200 and ADF 100.

The CPU circuit unit 209 controls a separating motor M1 which performs separation of the document sheets. Also, the CPU circuit unit 209 controls a registration motor M2 for driving the registration roller 106. Also, the CPU circuit unit 209 controls a belt motors M3 for driving the reading belt 108 and the discharge roller 109.

Also, the CPU circuit unit 209 controls a large size detect sensor S1 and a small size detect sensor S2 to detect length of the document sheet put on the document-sheet tray 102. Also, the CPU circuit unit 209 controls a width detect volume VR1, which is not illustrated, placed in the document-sheet width guide 107 and a width detect sensor S3. Also, the CPU circuit unit 209 controls a size sensor S4 which measures sheet unit length at the same time as detecting a document sheet, which is separately transported, by detecting the top edge and the back end edge of the document sheet, a lead sensor S5 which detects the top edge of the document sheet and informs of a reading signal, a discharge sensor S6, and so on. A sheet set sensor S7 is a sensor to detect whether a document sheet is set on the document-sheet tray 102.

A scanner motor M4 for moving the scanner unit 206 arranged in the image reader 200 to perform scanning, and the opening and closing detect sensors S8 and S9 are placed in the CPU circuit unit 209. The CPU circuit unit 209 is connected to a scanner unit control unit 204 controlling a lamp and an image sensor included in the scanner unit 206.

Also, the CPU circuit unit 209 is connected to electrical paper detecting units 101 and 202 to detect electrical paper, and the page switching unit 203 to switch a page of the electrical paper. The CPU circuit unit 209 controls the electrical paper detecting units 101 and 202 and the page switching unit 203 by the CPU 210. Furthermore, the CPU circuit unit 209 communicates with a CPU 401 in the CPU circuit unit 400 via a CPU_I/F 213, in real time.

The electrical paper detecting units 101 and 202 are provided with an antenna, a sending unit, a receiving unit and soon for communicating with the electrical paper by RFID, which are not illustrated. Image forming apparatus 10 of the present embodiment can communicate with electrical paper using RFID included in the electrical paper detecting units 101 and 202. The means to detect electrical paper may be configured such that electrical paper has an electrode and power is provided from ADF. The means to detect electrical paper may be configured such that the reflectivity of an optical sensor or the like is detected. The means is not limited to the above cases.

An operation process in the image forming apparatus 10, which is performed in a case where an image is read from an electrical paper in which an image file having a plurality of pages is stored, are described below.

Figure 5:
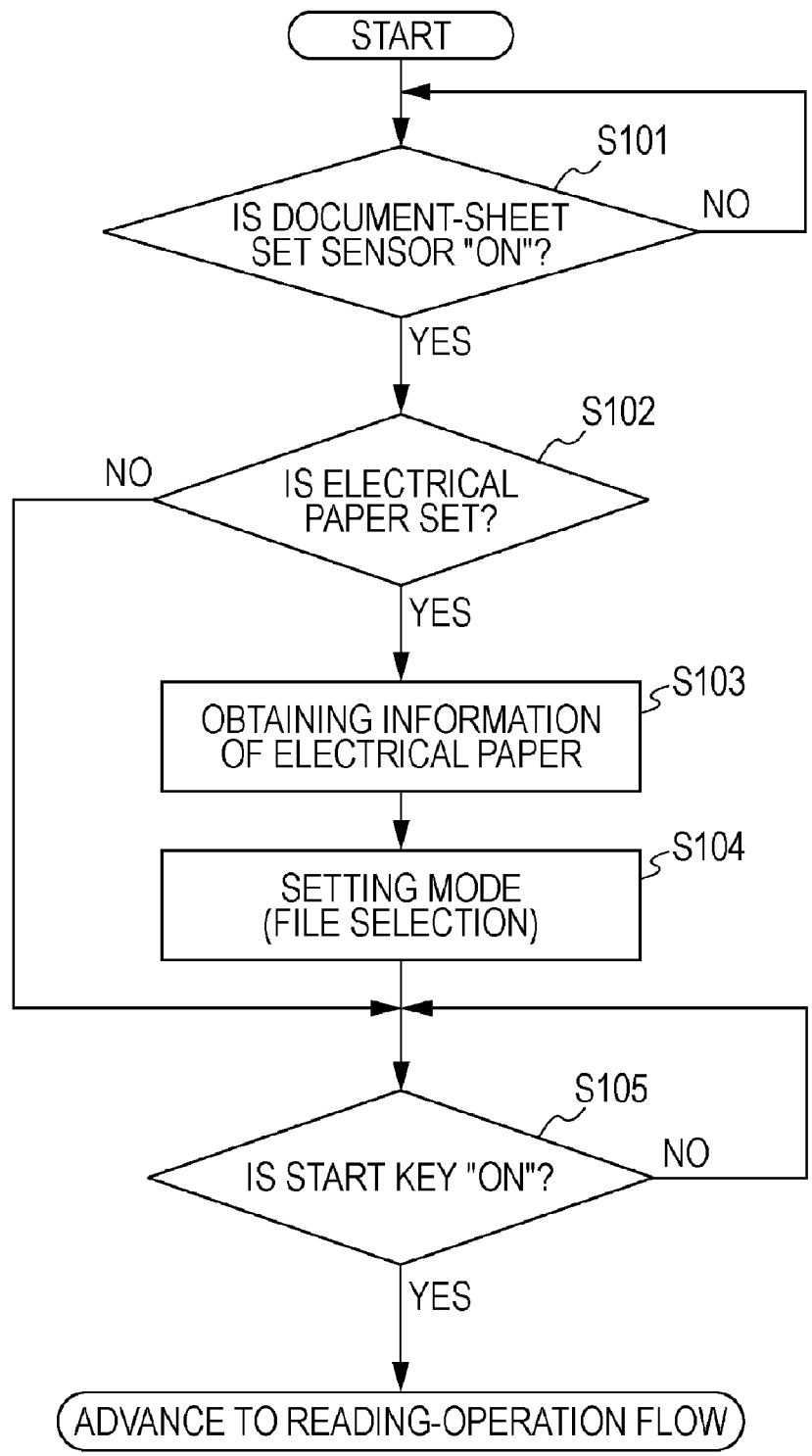
FIG. 5 is a flow chart of processing performed in the image forming apparatus.

FIG. 5 is a flow chart which shows an example of an electrical paper determination process performed by the image forming apparatus 10. The electrical paper detection process is performed by reading a program stored in a memory unit such as the ROM 402 and performing the read program by the CPU 401 in the CPU circuit unit 400.

First, a user opens the ADF 100 and puts an electrical paper as an original document on the document-sheet positioning glass plate 205. The CPU 210 monitors the opening and closing sensors S8 and S9, and determines whether the opening and closing detect sensors S8 and S9 have turned ON (Step S101). In a case where the opening and closing detect sensors S8 and S9 turned ON, it is determined that there is a document sheet on the document-sheet positioning glass plate 205 and the processing advances to step S102. Then, in step S102, the CPU 210 determines whether a detection signal was received from the electrical paper detecting unit 202. When a detection signal was not received (NO in step S102), the CPU 210 determines that the document sheet is a paper medium and waits until a start key which is placed on the operation unit 800 but is not illustrated is pushed down (step S105). A normal image reading process (the image reading process for a paper medium) is performed when a start key was pushed down (YES in step S105).

On the other hand, when the electrical paper detecting unit 202 received a signal from an RFID tag mounted on the electrical paper and the CPU 210 received a detection signal from the electrical paper detecting unit 202, it is determined that the document sheet is a electrical paper (YES in step S102). Then, in step S103, the CPU 210 acquires various information from the electrical paper (step S103). Information acquired by the CPU 210 includes image information of image data stored in the electrical paper (file information) and electrical paper information of the electrical paper. The image information (file information) is information such as the number of pages of a file (the number of pages of each file if these are a plurality of files), and a size of image data. The electrical paper information is information such as a size of the electrical paper itself.

Figure 6:
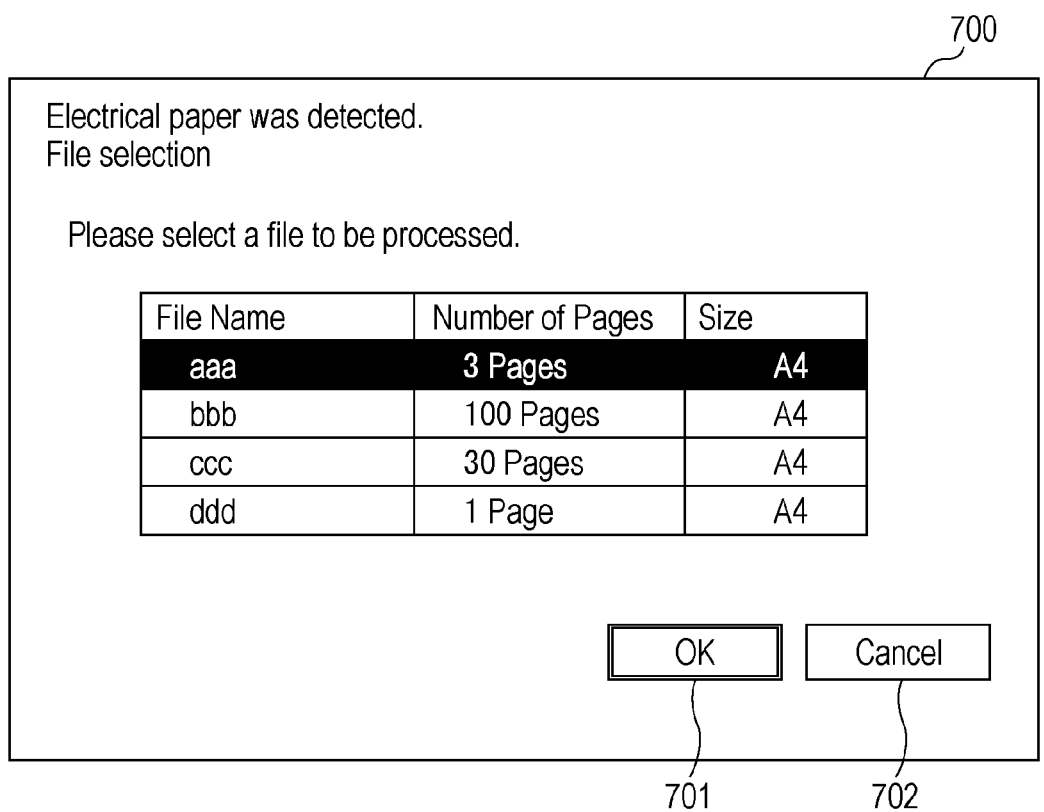
FIG. 6 is an example of a screen displayed by an operation unit of the image forming apparatus.

Next, in step S104, the CPU 210 displays a screen 700 as shown in FIG. 6 on a display device of the operation unit 800 based on the information acquired in step S103, and leads a user to select a file on which the image reading process is to be performed. In the illustration example, a filename "aaa" is selected (a slanted line part). When a file is selected by user, a setting screen which is not illustrated is displayed, and the setting of a detailed reading condition is accepted. The display form and display method of the setting screen do not matter as long as a reading condition can be set.

When the file selection is finished in the screen 700, the user pushes down an OK button 701. On the other hand, the user pushes down a cancel button 702 when the process is canceled. Next, when the CPU 210 determines whether a start button which is not illustrated was pushed down on the operation unit 800 (step S105). If the CPU 210 determines that the start button was pushed down, the image reading process of the electrical paper is started based on the set reading condition.

The image forming apparatus 10 is also capable of performing the image reading with the stationary-document-reading mode using the ADF 100. In this case, it is determined whether the document sheet has been put on the document-sheet tray 105, by the document-sheet set sensor S7. When it is determined that the document sheet has been put on the document-sheet tray 105, steps S102 to S105 shown in FIG. 5 are performed. Also, the electrical paper detecting unit 101 is used for determining whether a document sheet put on document-sheet tray 105 is an electrical paper or not. When the start key which is not illustrated is pushed down after processing of steps S101-S105, the electrical paper on the document-sheet tray 105 is transported to the document-sheet positioning glass plate 205 and is stopped, and then reading of an image which was scanned by the scanner unit 206 and was displayed by the electrical paper is performed. The switching of the displayed image of the electrical paper is performed by the page switching unit 203.

Figure 7:
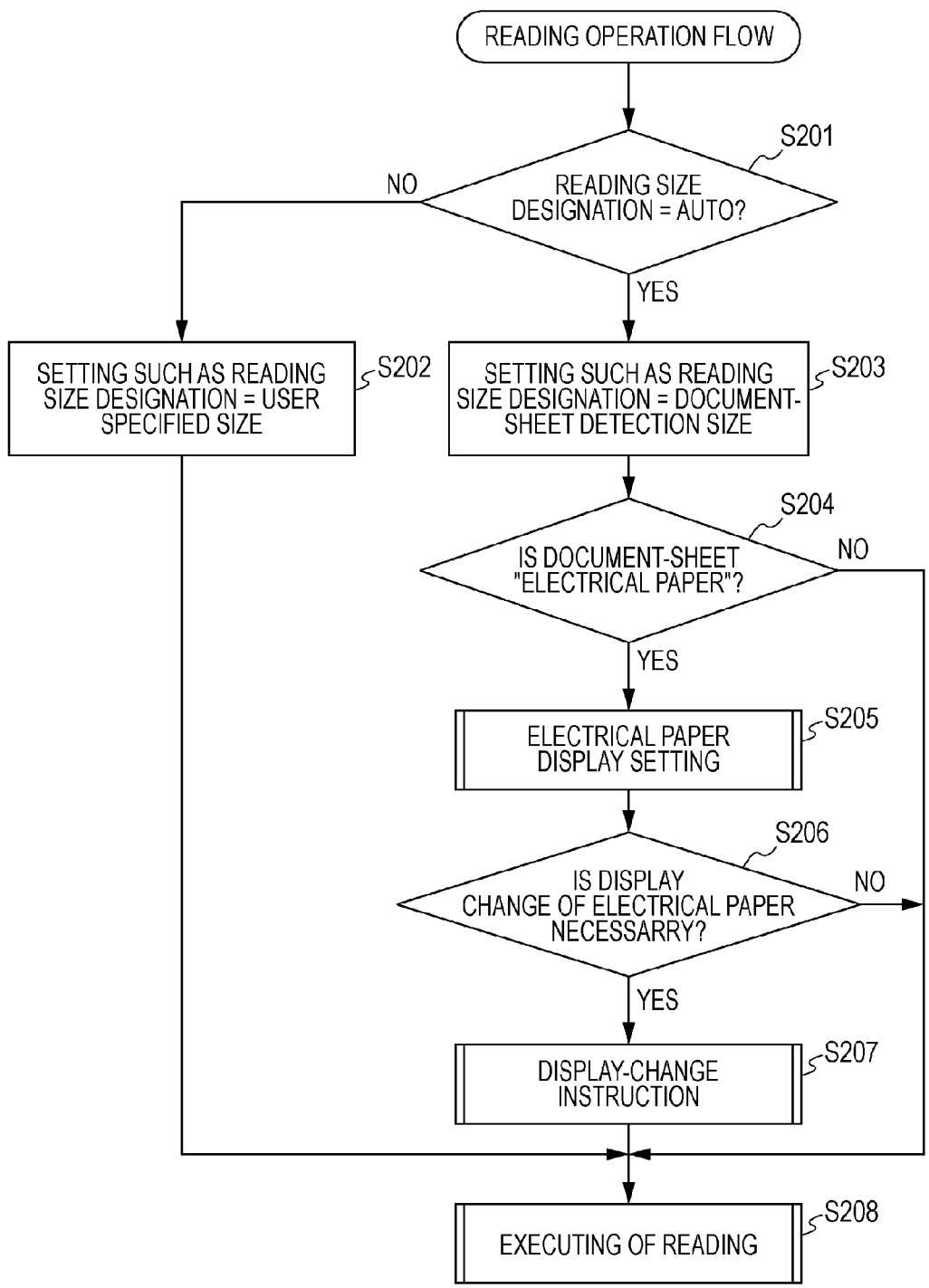
FIG. 7 is a flow chart of processing performed in the image forming apparatus.

FIG. 7 is a flow chart showing reading operation performed in the image forming apparatus 10 of the embodiments of the present invention. The reading operation is performed by reading a program stored in a memory unit such as ROM 402 and executing the program by the that the CPU 401 in the CPU circuit unit 400.

First, the CPU 401 determines whether a particular size is specified as a reading size indicating a size used for reading a document sheet by a user or automatic (AUTO) is specified as the reading size (step S201). When the particular size is specified as the reading size by a user (No in S201), the size designated by the user is set as the reading size (step S202). On the other hand, when the automatic is set (Yes in step S201), a document-sheet size detected by the document-sheet size detection mechanism is set as the reading size (step S203).

Furthermore, the CPU 401 determines whether the document sheet currently set is paper or electrical paper (step S204). When it is determined that the electrical paper is set, an electrical paper display setting process is performed (step S205).

Using FIG. 8, the electrical paper display setting process will be described specifically. The electrical paper display setting process is performed by reading a program stored in a memory unit such as the ROM 402 and performing the program by the CPU 401 in the CPU circuit unit 400 of the image forming apparatus 10.

First, the CPU 401 acquires a size of the electrical paper itself from information acquired in S103 (step S301). Also, a size of an image data of a file selected in S104 by a user is acquired from information acquired in S103 (step S302). In the example of FIG. 6, a file "aaa" is selected, and a size of this case is A4.

Next, the CPU 401 compares the size acquired in S302 with the size acquired in S301, and determines whether the size of the image data fits the size of the electrical paper (step S303). When it is determined that the size of the image data fits the size of the electrical paper (Yes in S303), the processing advances to step S206 of FIG. 7. On the other hand, when it is determined that the size of the image data does not fit the size of the electrical paper (No in S303), a screen of FIG. 9 is displayed on the display unit of the image forming apparatus 10 (step S5304).

Figure 9:
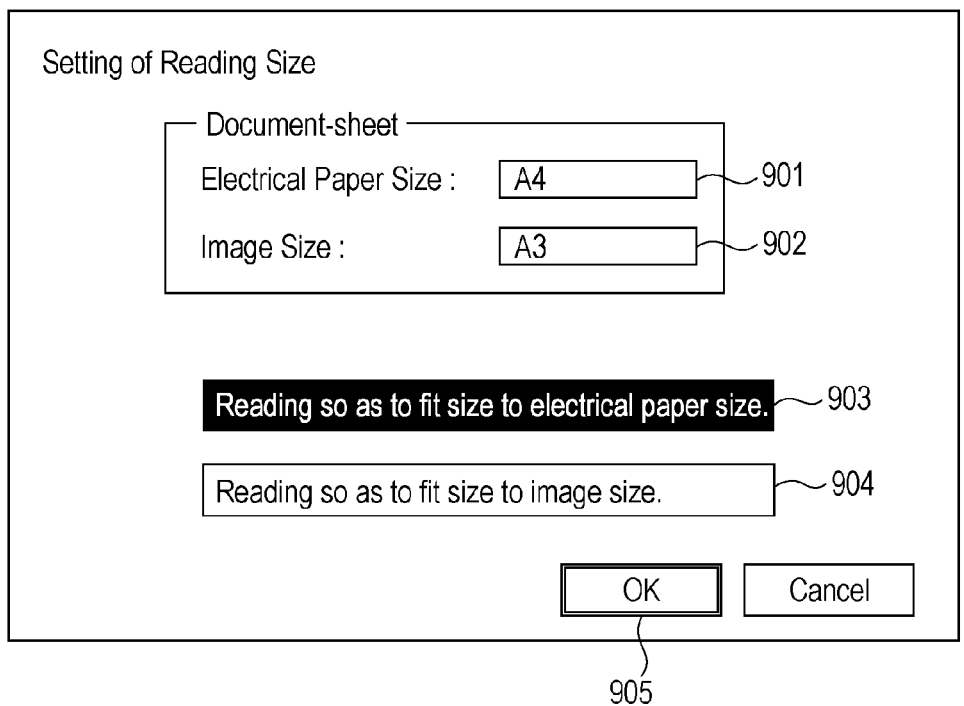
FIG. 9 is an example of a screen displayed by the operation unit of the image forming apparatus.

FIG. 9 is a screen to allow a user to select the reading size. In FIG. 9, the size of electrical paper acquired in S301 is displayed on an area 901, and the size of image data acquired in S302 is displayed on an area 902. The user can select whether the reading is performed according to the size of the electrical paper or the size of the image data, by pushing down a button 903 or 904. And, according to a result of the selection of these keys, the reading size is determined. That is, the reading size is determined by pushing down an OK button 905 in the conditions where the button 903 or 904 was pushed down.

The CPU 401 determines whether the size of the image data was selected or the size of the electrical paper was selected, as the reading size (step S305). When the size of the electrical paper is selected through the screen of FIG. 9 by the user (Yes in S305), the CPU 401 sets the size of the electrical paper as the reading size (step S306).

Then, the CPU 401 compares the size of the image data with the size of the electrical paper, and determines whether the size of the electrical paper is bigger than the size of the image data (step S307). When it is determined that the size of the electrical paper is bigger than the size of the image data (Yes in S307), the image data to be displayed on the electrical paper is enlarged in the size of the electrical paper and is displayed. On the other hand, when it is determined that the size of the electrical paper is smaller than the size of the image data (No in S307), the image data to be displayed on the electrical paper is reduced in the size of the electrical paper, and is displayed.

When the size of the image data is selected through the screen of FIG. 9 by the user (No in S305), the CPU 401 sets the size of the image data as the reading size (step S310).

Then, the CPU 401 compares the size of the image data with the size of the electrical paper, and determines whether the size of the electrical paper is bigger than the size of the image data (step S311). When it is determined that the size of the electrical paper is bigger than the size of the image data (Yes in S311), setting to move a display position of the image data to be displayed on the electrical paper (image moving setting) is performed (step S313). On the other hand, when it is determined that the size of the electrical paper is smaller than the size of the image data (No in S311), setting to divide the image data to be displayed on the electrical paper in the size of the electrical paper and to display the divided image data (image division setting) is performed (step S312).

Using FIGS. 10 and 11, the processing of the image division setting performed in 5312 will be explained concretely.

Figure 10:
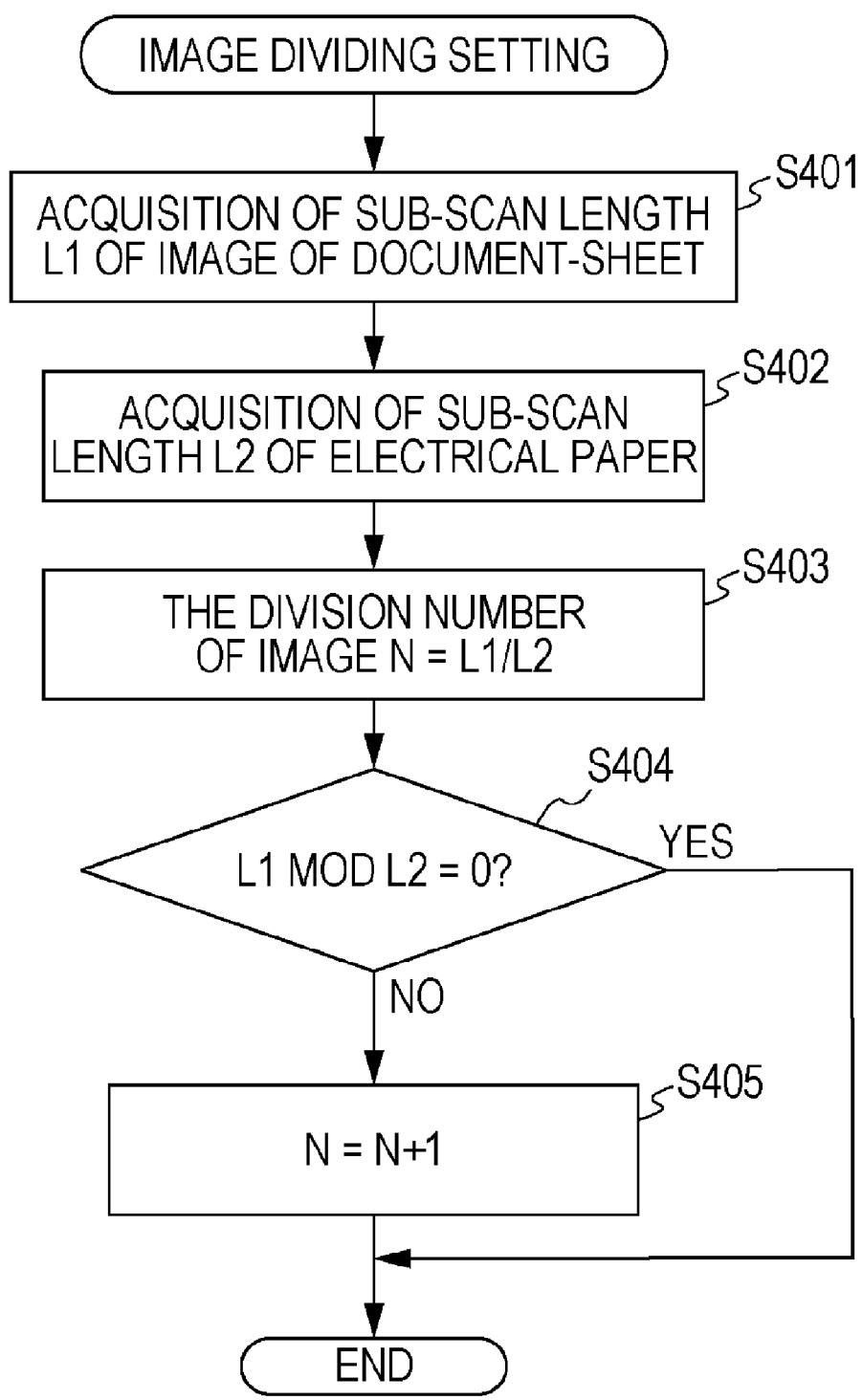
FIG. 10 is a flow chart of processing performed in the image forming apparatus.
Figure 11:
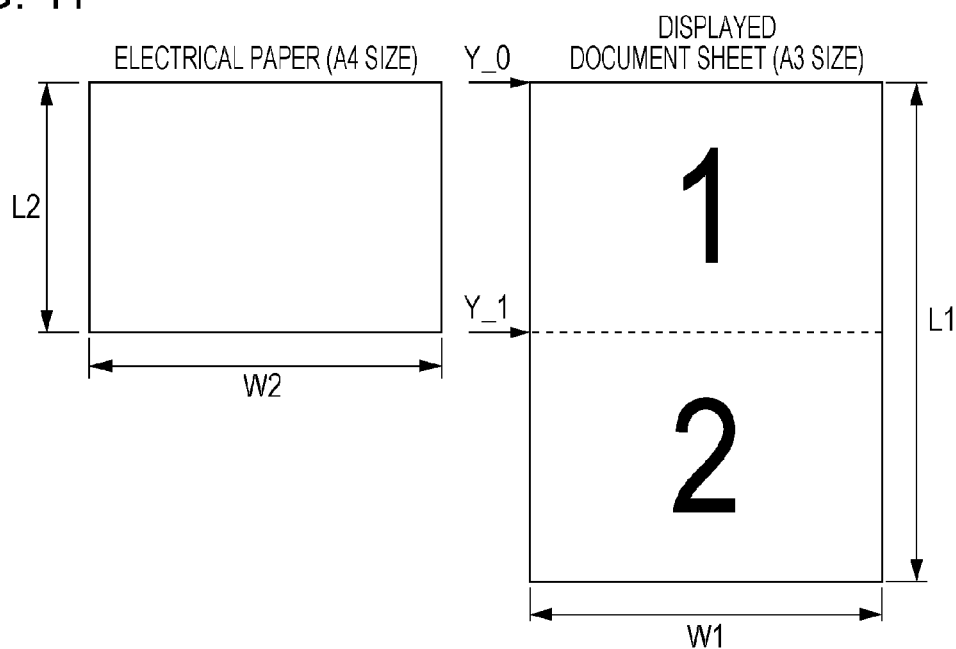
FIG. 11 is a specific example of a process of an image division setting.

FIG. 10 is a flowchart showing the process of the image division setting. Each step of the flow chart is performed by reading a program stored in a memory unit such as the ROM 402 and performing the program by the CPU 401 in the CPU circuit unit 400 of the image forming apparatus 10.

First, the CPU 401 acquires sub-scan length L1 of an image data subjected to be displayed (step S401). Then, sub-scan length L2 of the electrical paper is acquired (step S402). And, the CPU 401 calculates the division number of image by calculating L1/L2 (step S403). Also, it is determined whether a remainder is left in a calculation of L1/L2 (step S404), and (N+1) that 1 is added to the division number of image N is set as the division number of image when a rest appears (step S405). The division number of image N is demanded by taking the above-mentioned steps. FIG. 11 is a specific example of processing of the image division setting when the size of the electrical paper is A4 (A4 in landscape orientation) and the size of the image data is A3 (A3 in portrait orientation). First, the sub-scan length L1 of the image data is 420 mm, and the sub-scan length L2 of the electrical paper is 210 mm. And, the division number of image N=L1/L2 becomes 2. In this case, the division number of image N=2, because the remainder is not left.

Next, using FIGS. 12-14, the process of the image moving setting performed in S313 will be explained concretely.

Figure 12:
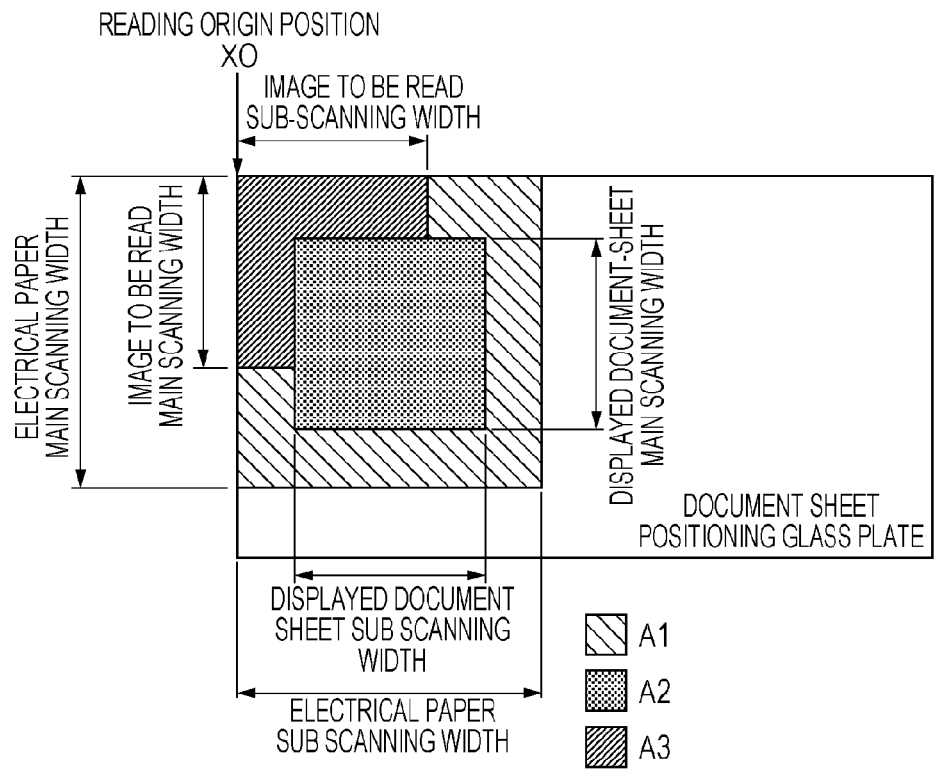
FIG. 12 is a specific example of an area where an image is read.

First, an area to be read when a document sheet is set on the document-sheet positioning glass plate and reading for the document sheet is performed is described using FIG. 12.

A reading start position is origin X0 on the document-sheet positioning glass plate. The reading is started at the origin X0, and the area for the document sheet size is read. When the display area of the electrical paper is bigger than the size of the image data subjected to be displayed, the image data is displayed after performing positioning such as the centering/right adjustment/left adjustment. If the centering of image data is made for both the main and sub scan directions and the image data is displayed, the display area of the image data is A2 while the display area of the electrical paper is A1. In a case where a user sets the size of the image data as the reading size and performs the reading of the document sheet, only data in area of A3 will be read because the reading of the document sheet is performed on the basis of X0. In this case, since some area of the image data is not read, the area will be lacked.

Figure 13:
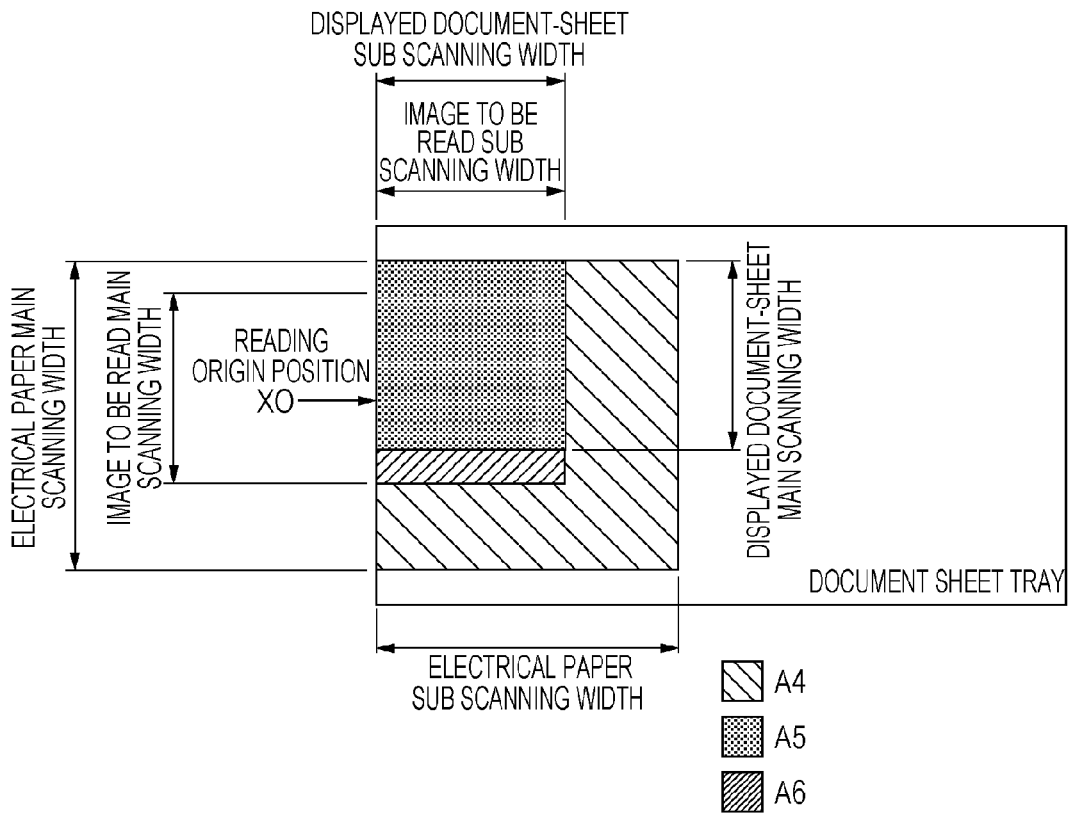
FIG. 13 is a specific example of an area where an image is read.

Next, the area to be read when the reading is performed using ADF is described using FIG. 13.

When the ADF is used, the main scanning width set on the basis of the center of the reading sensor is read as an effective image area (center standard reading). When the display area of the electrical paper (A4) is bigger than the size of the image data subjected to be displayed, an area on which the ADF performs reading based on the size of the image data is an area of A6. In this regard, when a display position of the image data in the electrical paper is the upper right corner standard, an area read for real by ADF is A6 but an area where the image data is displayed is A5. In this case, since some area of the image data is not read, the area will be lacked.

Because of such an issue, the image moving setting is processed in S313. FIG. 14 is a flow chart showing a process of the image moving setting. Each step of the process is performed by reading a program stored in a memory unit such as ROM 402 and performing the program by the CPU 401 in the CPU circuit unit 400 of the image forming apparatus 10.

First, the CPU 401 determines whether a document sheet is read from a platen or read using the ADF (step S501). When the reading is performed from the platen (Yes in S501), setting to move a display position of the image data to be displayed on the electrical paper to a reading start position on the platen, namely, to an area of A3 of FIG. 12 is performed (step S502). On the other hand, when the reading is performed from the ADF (No in S501), setting to move a display position of the image data to be displayed on the electrical paper, to an area of A6 of FIG. 13 is performed (step S503).

Figure 8:
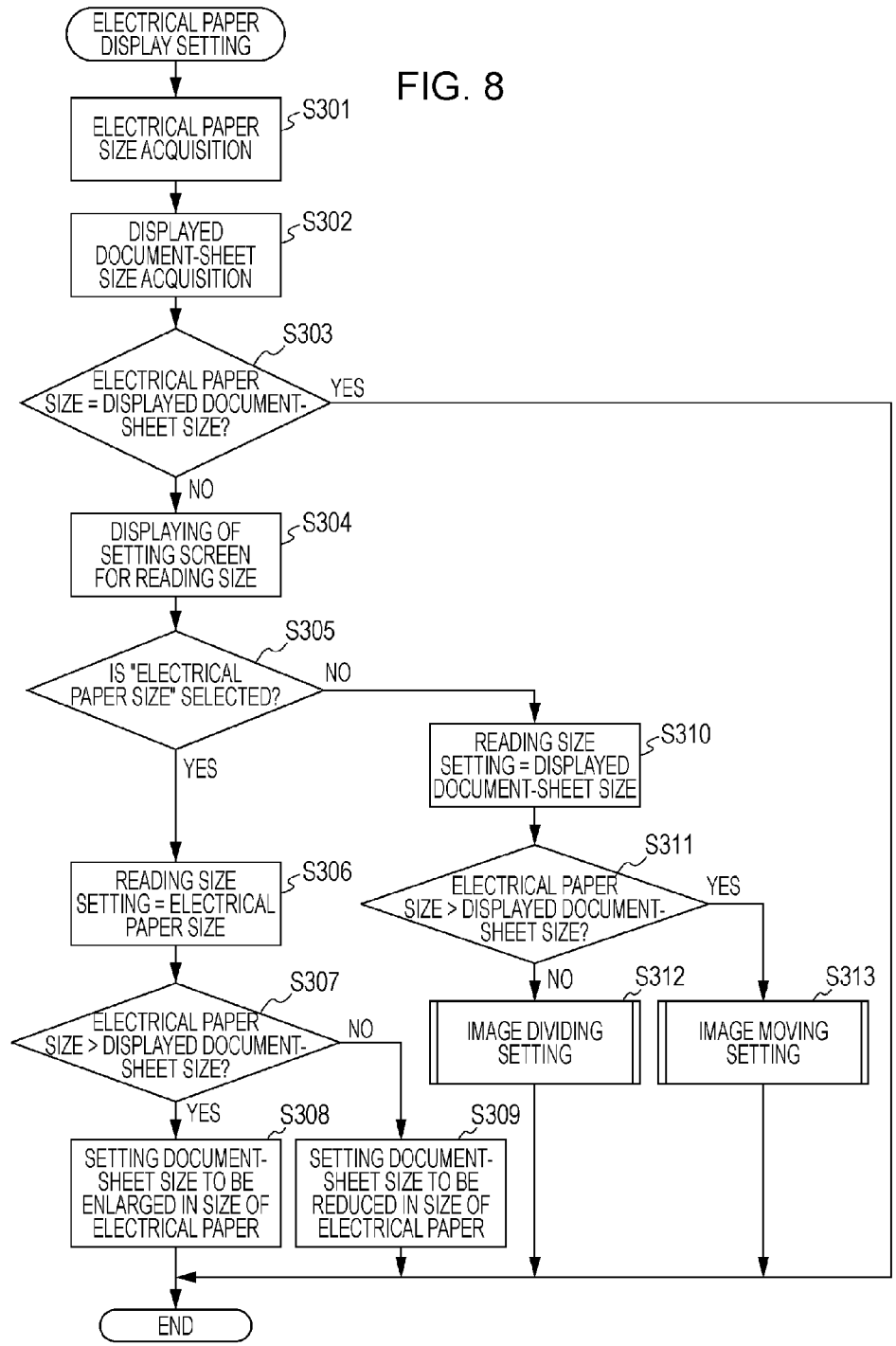
FIG. 8 is a flow chart of processing performed in the image forming apparatus.
Figure 14:
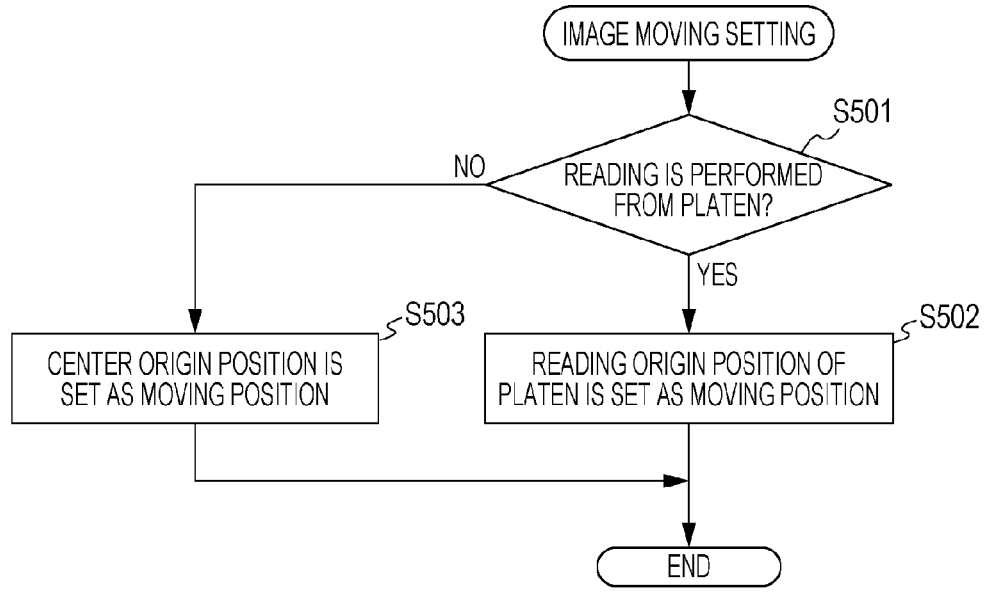
FIG. 14 is a flow chart of processing performed in the image forming apparatus.

When the electrical paper display setting process is finished by the processing shown in each of FIGS. 8, 10 and 14, the processing advances to step S206 in a flow of FIG. 7. The CPU 401 determines whether change of display of the electrical paper is to be performed, by the processing of FIGS. 8, 10, and (step S206). When the change of the display is to be performed (Yes in S206), a process for issuing a display change instruction to the electrical paper is performed (step S207).

Figure 15:
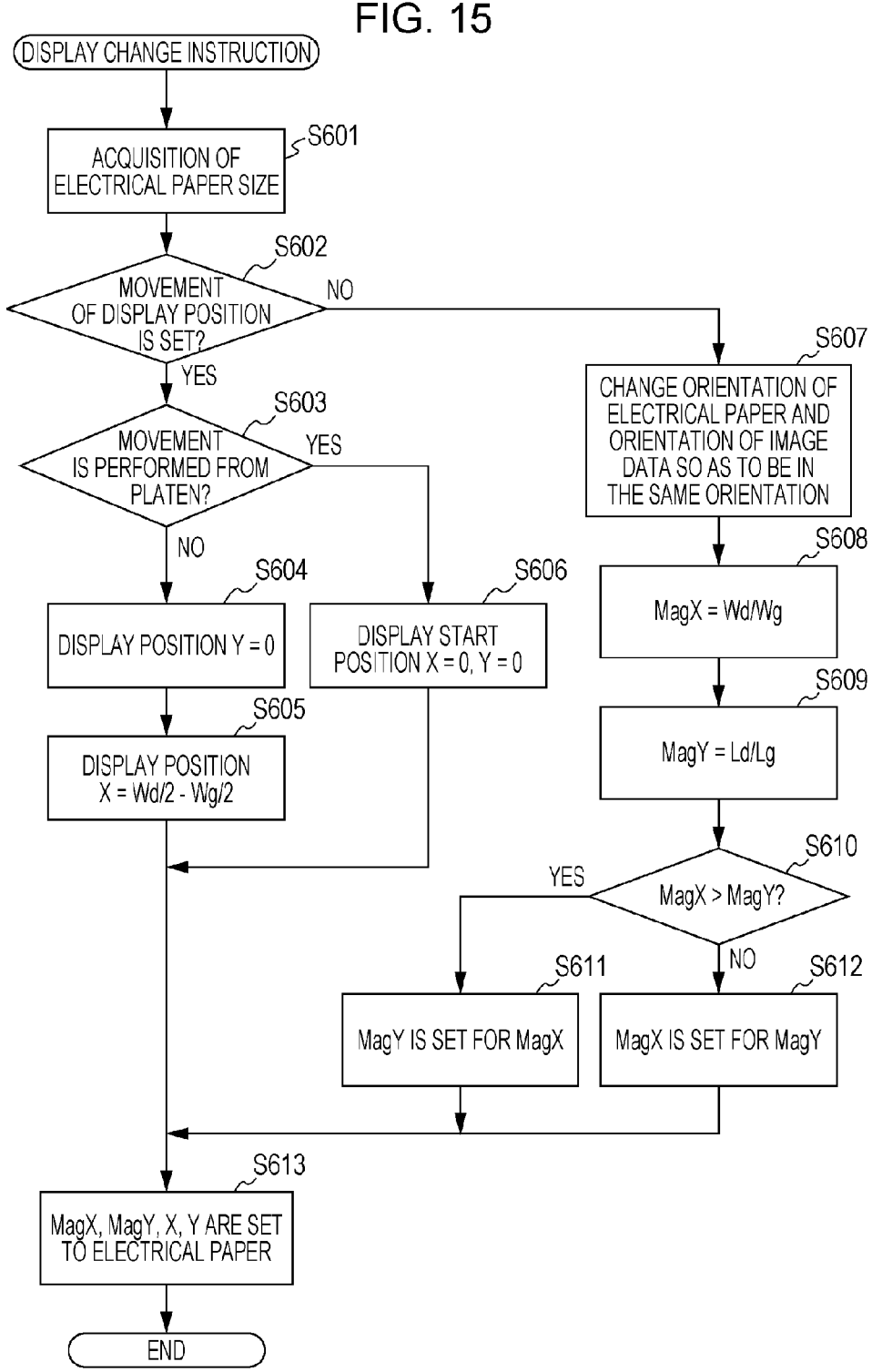
FIG. 15 is a flow chart of processing performed in the image forming apparatus.

Using FIG. 15, the process in which the image forming apparatus 10 instructs the electrical paper to perform the display change is described. Each step of the flowchart shown in FIG. 15 is performed by reading a program stored in a memory unit such as ROM 402 and performing the program by the CPU 401 in the CPU circuit unit 400 of the image forming apparatus 10.

First, the CPU 401 acquires a size of the electrical paper itself from information acquired in S103 (step S601). In this regard, the acquired information is the main scan length (Wd) and the sub-scan length (Ld) of the electrical paper.

Then, the CPU 401 determines whether movement of the display position of the image data is set by the process of FIG. 14 (step S602). When movement of the display position is set (Yes in S602), it is determined whether reading is performed from the platen or form the ADF (step S603). In this regard, it is assumed that the upper left of the display area of the electrical paper is the origin (X=0, Y=0). When the reading is performed from the platen (Yes in S603), the display position of the image data is set to the origin (X=0, Y=0) (step S606). On the other hand, when the reading is performed from the ADF (No in S603), the display position of the image data is set to (Y=0, X=Wd/2−Wg/2) (steps S604, S605). In this regard, Wg is the main scan length of the image data subjected to be displayed.

When movement of the display position is not set in the determination in S602 (No in S602), the processing advances to step S607. In this case, a display size of the image data to be displayed is changed.

First, the CPU 401 communicates with the electrical paper, and changes the orientation of the electrical paper and the orientation of the image data so as to be in the same orientation. That is, if the electrical paper is put in the portrait orientation, the orientation of the image data is changed to the portrait orientation, and if the electrical paper is put in the landscape orientation, the orientation of the image data is changed to the landscape orientation. Then, in order to display image data subjected to be displayed such that the image data is fitted to a size of the electrical paper, the CPU 401 calculates a varying magnification for expanding (or reducing) the image data. First, a varying magnification of the main scan direction "MagX=Wd/Wg" is calculated (step S608). Next, a varying magnification of the sub-scan direction "MagY=Ld/Lg" is calculated (step S609). And, after calculation of each varying magnification, a value of the smaller varying magnification is set to the other to maintain aspect ratio of the image data. First, the CPU 401 compares a value of the calculated MagX with a value of the calculated MagY to determine which one is large or small (step S610). When the value of MagX is larger than the value of MagY as a result of comparison (Yes in S610), the value of MagY is used for the value of MagX (step S611). That is, the value of MagY is used as the varying magnification. On the other hand, when the value of MagY is larger than the value of MagX as a result of comparison (No in S610), the value of MagX is set for the value of MagY (step S612). That is, the value of MagX is used as the varying magnification.

The CPU 401 sets each of values of the calculated MagX, MagY, X, and Y to the electrical paper (step S613). The above are the process in which the image forming apparatus 10 instructs the electrical paper to perform the display change.

When the processing of FIG. 15 is finished, the processing advances to step S208 in FIG. 7, and then the reading operation of an image of the document-sheet is performed.

Figure 16:
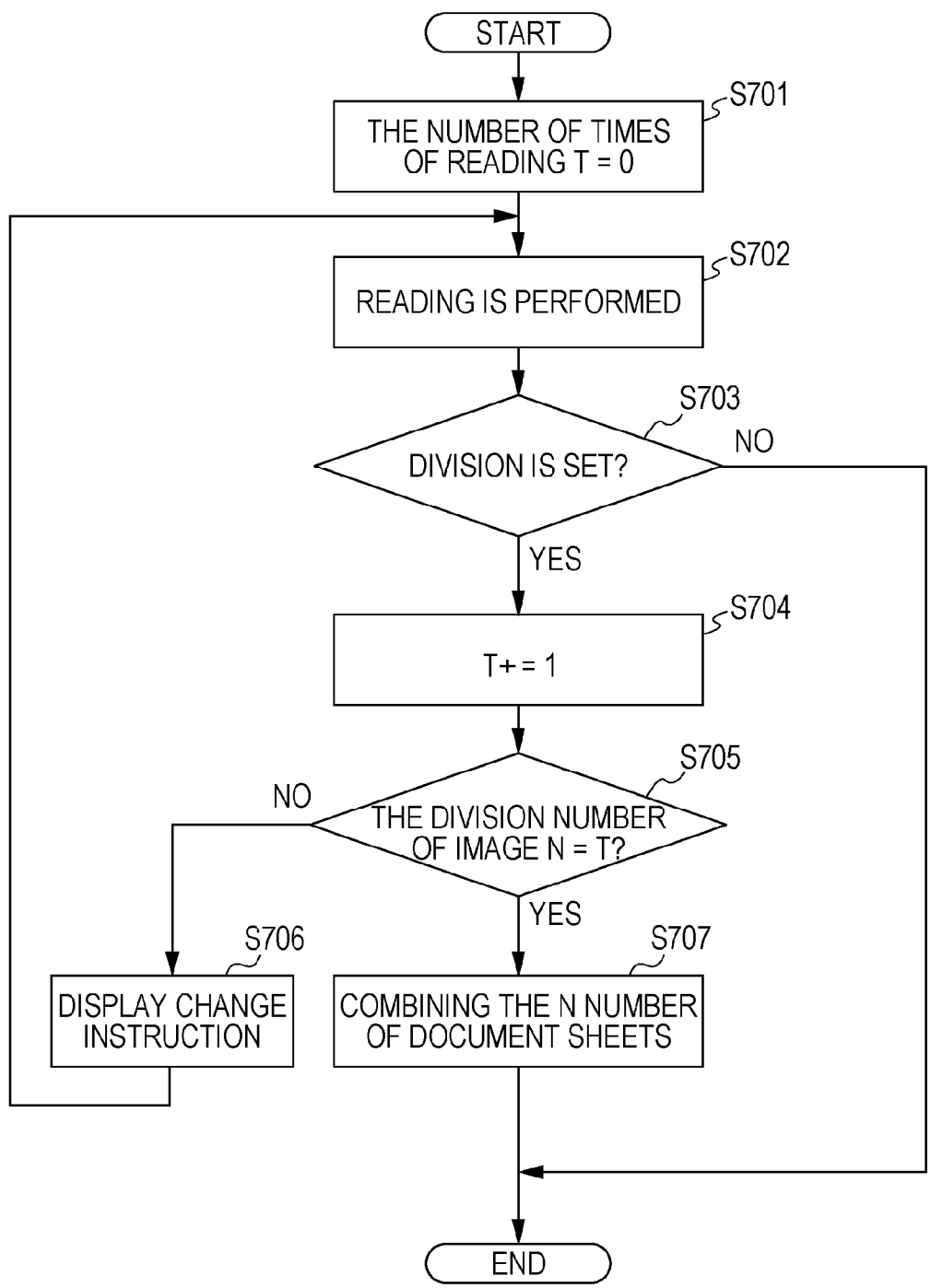
FIG. 16 is a flow chart of processing performed in the image forming apparatus.

FIG. 16 is a flow chart specifically showing the document-sheet reading operation of the image forming apparatus 10 in S208 of FIG. 7. Each step of the flow chart of FIG. 16 is performed by reading a program stored in a memory unit such as ROM 402 and performing the program by the CPU 401 in the CPU circuit unit 400 of the image forming apparatus 10.

First, the CPU 401 initializes a value of the number of times of reading T to 0 (step S701). And, the reading of the image of the document-sheet is performed under the control of the image reader control unit 201 (step S702). Then, the CPU 401 determines whether the image division setting is set based on a flow of FIG. 10 (step S703). When the image division setting is not set, the sheet reading operation is finished. On the other hand, when the image division setting is set, a value of division number of image N calculated by a flow of FIG. 10 is acquired. And, the CPU 401 increments a value of the number of times of reading T by 1 (step S704). The CPU 401 determines whether the value of T incremented by 1 in S704 is equal to the division number of image N (step S705). When the value of T is not equal to the division number of image N (No in S705), the CPU 401 issues an instruction to change a display content of the image data, to electrical paper (step S706). That is, the CPU 401 instructs the electrical paper to display remaining image data (remaining divided image data) which was not displayed when the reading operation was performed in S702. In the example of FIG. 11, half of the image data of the A3 size (image data shown as "1") is displayed on the electrical paper of the A4 size, and then the electrical paper will display remaining half of the image data (image data shown as "2") depending on instructions in S706.

Then, the processing advances to step S702 again, and reading is performed. When a value of the number of times of reading T equals the division number of image N in the determination of S705, a process for combining the N number of read images and generating one piece of image data is performed under the control of the CPU 401 (step S707).

The reading operation of an image of a document sheet is performed in the image forming apparatus 10, by taking the above-mentioned steps. In the embodiments discussed above, the reading operation is described by citing a case that image data to be stored in the electrical paper is of one page, but when the image data to be stored in the electrical paper is of a plurality of pages, the process will be repeated and performed for each page. When a user instructs a copy process, the read image data will be printed by a printer section after a predetermined image processing is performed. Also, the image forming apparatus 10 may transmit the read image data to another device through a network, and the read image data may be used for the FAX transmission. Alternatively, the read image data may be stored as image data in a memory unit included in the image forming apparatus 10.

According to the embodiments of the present invention, even if a size of the image data is different from a size of the electrical paper, according to the present embodiment, a user can select a reading size. And, even if a size of the image data is selected or a size of the electrical paper is selected as the reading size, the invention of the embodiments enables to prevent the reading that does not desired by a user from being performed in each case.

Other Embodiments

In the embodiments as discussed above, an image forming apparatus comprising a printer unit and so on is explained as one example of the image reading apparatus, but if an apparatus comprising at least a scanner unit, it may be other apparatus.

Also, in the above embodiments, reduction and expansion based on an image size are performed, but the reduction and expansion can be performed by changing resolution. That is, the image data of which the resolution is 600 dpi may be displayed in 300 dpi instead of performing magnification variation of 50% for the main scan direction and the sub scan direction.

Also, the present invention is implemented by performing the following process. That is, a software (program) implementing a function of the exemplary embodiment as discussed above is supplied in a system or a device through a network or various storage mediums, and a computer (or CPU, MPU or the like) of the system or the device reads and performs the program. In this case, the present invention will be comprised of the program and the storage medium which stores the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An apparatus comprising:
    a selecting unit configured to, when an image displayed on an electrical paper is read, select whether the image is read based on a size of the electrical paper or a size of an image data; and
    an instruction unit configured to instruct the electrical paper to change a display content of the image to be displayed on the electrical paper, in accordance with a result of the selection.

2. The apparatus according to claim 1, further comprising a determination unit configured to determine whether the size of the electrical paper is equal to the size of the image data.

3. The apparatus according to claim 2,
    wherein the instruction unit instructs the electrical paper to change the display content in a case where the size of the electrical paper is not equal to the size of the image data.

4. The image reading apparatus according to claim 1, wherein in a case where reading based on the size of the electrical paper is selected and the size of the electrical paper is larger than the size of the image data, the instruction unit instructs the electrical paper to display the image data by expanding the image data to the size of the electrical paper.

5. The apparatus according to claim 4, wherein in a case where reading based on the size of the electrical paper is selected and the size of the electrical paper is smaller than the size of the image data, the instruction unit instructs the electrical paper to display the image data by reducing the image data to the size of the electrical paper.

6. The apparatus according to claim 1,
    wherein in a case where reading based on the size of the image data is selected and the size of the electrical paper is smaller than the size of the image data, the instruction unit instructs the electrical paper to display the image data by dividing the image data.

7. The apparatus according to claim 1,
    wherein in a case where reading based on the size of the image data is selected and the size of the electrical paper is larger than the size of the image data, the instruction unit instructs to display the image data by changing a display position of the image data in the electrical paper.

8. The apparatus according to claim 5,
    wherein the display position instructed by the instruction unit varies depending on whether the reading of the image is performed for the electrical paper set in a document conveying device or for the electrical paper set on a platen.

9. A method comprising:
    selecting whether an image displayed on an electrical paper is read based on a size of the electrical paper or a size of image data, when the image is read; and
    instructing the electrical paper to change a display content of the image to be displayed on the electrical paper, in accordance with a result of the selection.

10. A non-transitory computer readable storage medium storing a computer-executable program of instructions for causing a computer to perform a method comprising:
    selecting whether an image displayed on an electrical paper is read based on a size of the electrical paper or a size of image data, when the image is read; and
    instructing the electrical paper to change a display content of the image to be displayed on the electrical paper, in accordance with a result of the selection.

* * * * *